United States Patent
Fujimori

(10) Patent No.: US 11,364,919 B2
(45) Date of Patent: Jun. 21, 2022

(54) DRIVING BEHAVIOR EVALUATION DEVICE, DRIVING BEHAVIOR EVALUATION METHOD, AND NON-TRANSITORY STORAGE MEDIUM STORING DRIVING BEHAVIOR EVALUATION PROGRAM

(71) Applicant: TOYOTA JIDOSHA KABUSHIKI KAISHA, Toyota (JP)

(72) Inventor: Masaya Fujimori, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 16/924,821

(22) Filed: Jul. 9, 2020

(65) Prior Publication Data
US 2021/0039656 A1 Feb. 11, 2021

(30) Foreign Application Priority Data
Aug. 7, 2019 (JP) .............................. JP2019-145369

(51) Int. Cl.
*B60W 40/09* (2012.01)

(52) U.S. Cl.
CPC ......... *B60W 40/09* (2013.01); *B60W 2400/00* (2013.01); *B60W 2520/10* (2013.01); *B60W 2540/30* (2013.01); *B60W 2554/4042* (2020.02); *B60W 2555/20* (2020.02)

(58) Field of Classification Search
CPC ............. B60W 40/09; B60W 2400/00; B60W 2520/10; B60W 2540/30; B60W 2554/4042; B60W 2555/20; B60W 30/162; G08G 1/0125; G08G 1/0137; G08G 1/052
See application file for complete search history.

(56) References Cited

U.S. PATENT DOCUMENTS

| | | | | |
|---|---|---|---|---|
| 9,081,650 B1* | 7/2015 | Brinkmann | ............ | G07C 5/008 |
| 9,646,428 B1* | 5/2017 | Konrardy | .............. | B60W 40/09 |
| 9,805,601 B1* | 10/2017 | Fields | .................... | B60T 17/22 |
| 9,870,001 B1* | 1/2018 | Mangal | .................. | B60W 50/08 |
| 2006/0034094 A1 | 2/2006 | Asada et al. | | |
| 2013/0289874 A1* | 10/2013 | Taguchi | .............. | B60W 30/146 701/533 |
| 2017/0341652 A1* | 11/2017 | Sugawara | .............. | G08G 1/166 |
| 2018/0015922 A1* | 1/2018 | McNew | ................ | B60W 10/18 |
| 2018/0061253 A1* | 3/2018 | Hyun | ..................... | G08G 1/015 |
| 2019/0168742 A1* | 6/2019 | Song | ..................... | B60W 20/20 |
| 2019/0215399 A1* | 7/2019 | Simon | .................. | B60W 30/00 |

(Continued)

FOREIGN PATENT DOCUMENTS

| | | |
|---|---|---|
| CN | 102800136 A | 11/2012 |
| JP | 2004-234260 A | 8/2004 |

*Primary Examiner* — Ryan W Sherwin
(74) *Attorney, Agent, or Firm* — Sughrue Mion, PLLC

(57) ABSTRACT

A driving behavior evaluation device includes a memory and a processor. In a case in which a speed of a target vehicle exceeds a regulation speed and an amount of deviation of the speed of the target vehicle with respect to an average speed of vehicles around the target vehicle is equal to or greater than a threshold value, the processor is configured to set an evaluation of driving behavior of the target vehicle to a lower value than in a case in which the speed of the target vehicle exceeds the regulation speed and the amount of deviation is less than the threshold value.

12 Claims, 10 Drawing Sheets

(56) References Cited

U.S. PATENT DOCUMENTS

| | | | |
|---|---|---|---|
| 2019/0232942 A1* | 8/2019 | Liu | B60W 20/19 |
| 2019/0382018 A1* | 12/2019 | Garnault | B60W 60/00272 |
| 2020/0290628 A1* | 9/2020 | Pinoteau | G08B 21/06 |
| 2021/0295443 A1* | 9/2021 | Webster | G07C 5/008 |

* cited by examiner

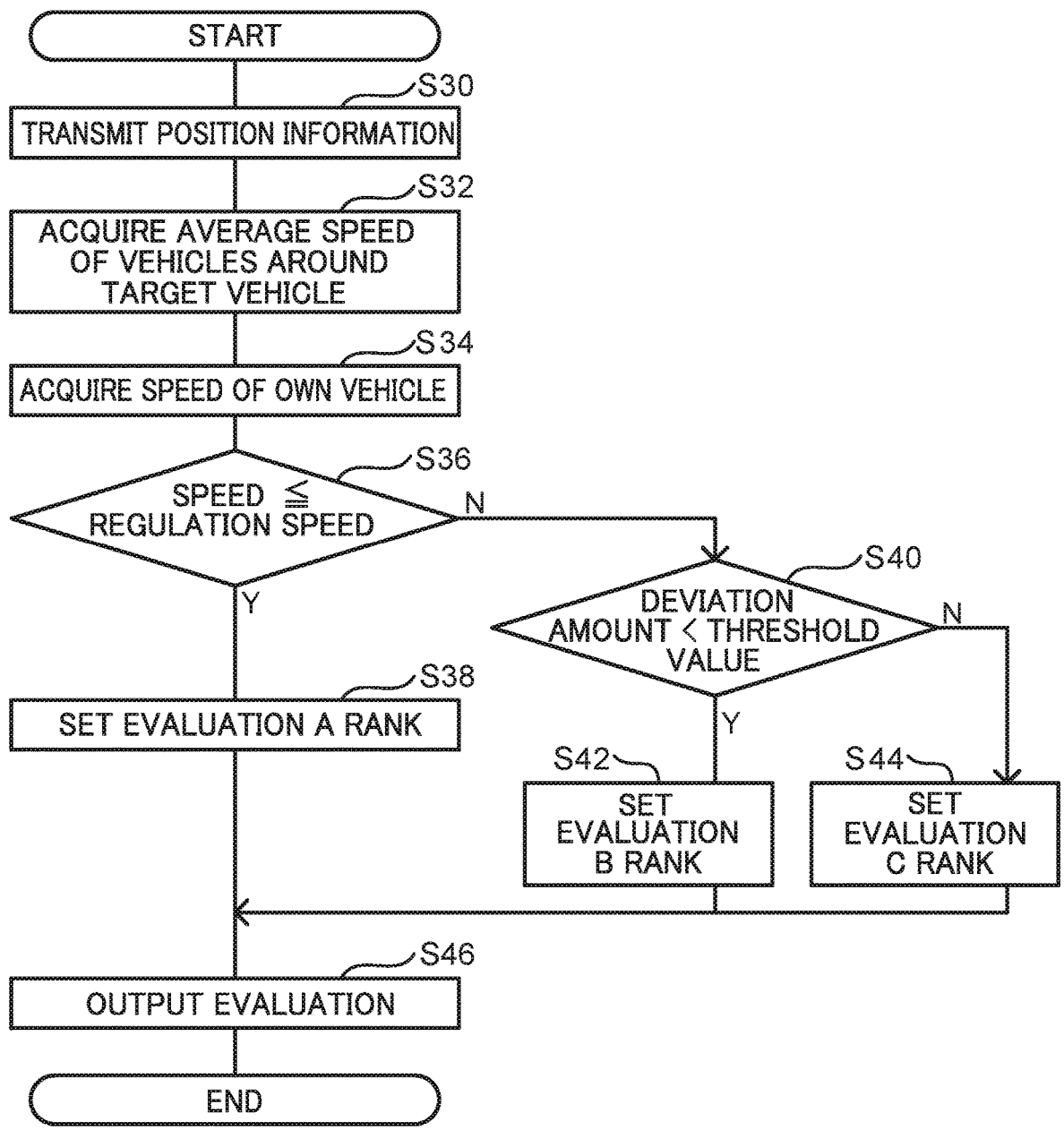

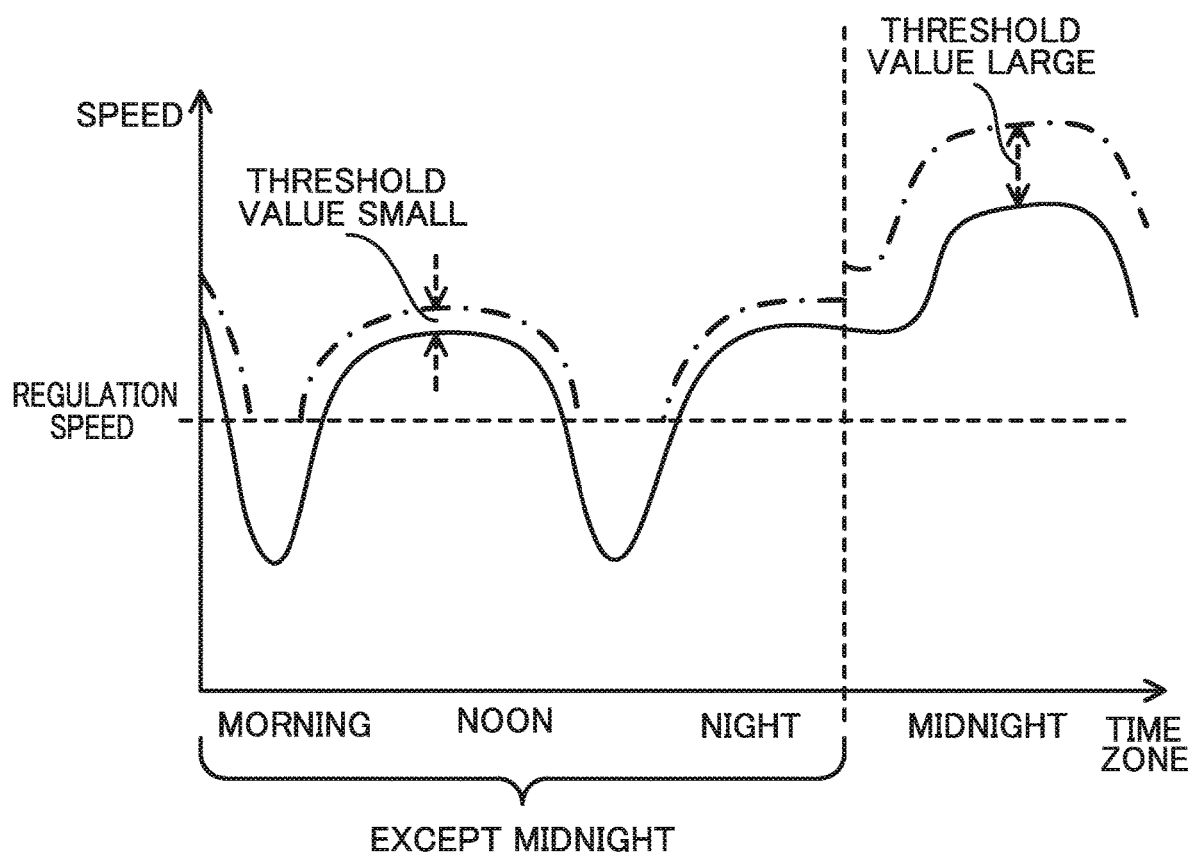

DRIVING BEHAVIOR EVALUATION DEVICE, DRIVING BEHAVIOR EVALUATION METHOD, AND NON-TRANSITORY STORAGE MEDIUM STORING DRIVING BEHAVIOR EVALUATION PROGRAM

CROSS-REFERENCE TO RELATED APPLICATION

This application is based on and claims priority under 35 USC 119 from Japanese Patent Application No. 2019-145369 filed on Aug. 7, 2018, the disclosure of which is incorporated by reference herein.

BACKGROUND

Technical Field

The present disclosure relates to a driving behavior evaluation device, a driving behavior evaluation method, and a non-transitory storage medium that stores a driving behavior evaluation program, which evaluates driving behavior of a vehicle.

Background Art

For example, Japanese Patent Application Laid-Open No. 2004-234260 discloses a technique of calculating a ratio of time during which the vehicle travels beyond the speed regulation within a travel time by comparing speed regulation information and vehicle speed information, and using the calculated ratio as one diagnostic item for driving diagnosis.

However, the technology described in Japanese Patent Application Laid-Open No. 2004-234260 does not consider the traffic flow including surrounding vehicles, and the driver may feel uncomfortable regarding the evaluation of the driving behavior of the vehicle.

SUMMARY

The present disclosure reduces a driver's discomfort regarding the evaluation of the driving behavior of a vehicle.

The driving behavior evaluation device according to a first aspect includes a setting unit that, in a case in which a speed of a target vehicle exceeds a regulation speed and an amount of deviation of the speed of the target vehicle with respect to an average speed of vehicles around the target vehicle is equal to or greater than a threshold value, the processor is configured to set an evaluation of driving behavior of the target vehicle to a lower value than in a case in which the speed of the target vehicle exceeds the regulation speed and the amount of deviation is less than the threshold value.

According to the driving behavior evaluation device of the first aspect, in a case in which a speed of a target vehicle exceeds a regulation speed and an amount of deviation of the speed of the target vehicle with respect to an average speed of vehicles around the target vehicle is equal to or greater than a threshold value, an evaluation of driving behavior of the target vehicle is set to a lower value in a case in which the speed of the target vehicle exceeds the regulation speed and the amount of deviation is less than the threshold value. Therefore, since the average speed of surrounding vehicles is taken into consideration, the driver's discomfort regarding evaluating the driving behavior of the vehicle can be reduced.

The driving behavior evaluation device according to a second aspect is the driving behavior evaluation device according to the first aspect, wherein the threshold value is set to a different value depending on a volume of traffic.

In the driving behavior evaluation device according to the second aspect, the driver's discomfort regarding evaluating the driving behavior of the vehicle can be reduced since the threshold value is set to a different value depending on the volume of traffic.

The driving behavior evaluation device according to a third aspect is the driving behavior evaluation device according to the second aspect, wherein the threshold value is set to a different value depending on at least one of a traveling area of the target vehicle or a traveling time of day of the target vehicle.

In the driving behavior evaluation device according to the third aspect, the driver's discomfort regarding evaluating the driving behavior of the vehicle can be reduced since the threshold value is set to a different value depending on at least one of the traveling area of the target vehicle or the traveling time of day of the target vehicle.

The driving behavior evaluation device according to a fourth aspect is the driving behavior evaluation device according to the third aspect, wherein the threshold value is set to a higher value in a case in which the traveling area of the target vehicle is a suburban area than in a case in which the traveling area of the target vehicle is an urban area.

In the driving behavior evaluation device according to the fourth aspect, the driver's discomfort regarding evaluating the driving behavior of the vehicle can be reduced since the threshold is set to a higher value in a case in which the traveling area of the target vehicle is a suburban area than in a case in which the traveling area of the target vehicle is an urban area.

The driving behavior evaluation device according to a fifth aspect is the driving behavior evaluation device according to the third aspect, wherein the threshold value is a higher value in a case in which the traveling time of day of the target vehicle is at night than in a case in which the traveling time of day of the target vehicle is a time other than at night.

In the driving behavior evaluation device according to the fifth aspect, the driver's discomfort regarding evaluating the driving behavior of the vehicle can be reduced since the threshold value is set to a higher value in a case in which the traveling time of day of the target vehicle is at night than in a case in which the traveling time of day of the target vehicle is a time other than at night.

In a driving behavior evaluation method according to a sixth aspect, in a case in which a speed of a target vehicle exceeds a regulation speed and an amount of deviation of the speed of the target vehicle with respect to an average speed of vehicles around the target vehicle is equal to or greater than a threshold value, a processor executes processing that sets an evaluation of driving behavior of the target vehicle to a lower value than in a case in which the speed of the target vehicle exceeds the regulation speed and the amount of deviation is less than the threshold value.

According to the driving behavior evaluation method of the sixth aspect, the driver's discomfort regarding evaluating the driving behavior of the vehicle can be reduced similarly to the driving behavior evaluation device of the first aspect.

A non-transitory storage medium that stores a driving behavior evaluation program according to a seventh aspect causes, in a case in which a speed of a target vehicle exceeds a regulation speed and an amount of deviation of the speed of the target vehicle with respect to an average speed of vehicles around the target vehicle is equal to or greater than a threshold value, a processor to execute processing that sets an evaluation of driving behavior of the target vehicle to a lower value than in a case in which the speed of the target vehicle exceeds the regulation speed and the amount of deviation is less than the threshold value.

According to the non-transitory storage medium storing the driving behavior evaluation program of the seventh aspect, the driver's discomfort regarding evaluating the driving behavior of the vehicle can be reduced similarly to the driving behavior evaluation device of the first aspect.

According to the present disclosure, it is possible to reduce a driver's discomfort regarding the evaluation of the driving behavior of the vehicle.

BRIEF DESCRIPTION OF THE DRAWINGS

Exemplary embodiments of the present invention will be described in detail based on the following figures, wherein:

FIG. 9 is a flowchart illustrating an example of a driving behavior evaluation process according to the first embodiment;

FIG. 10 is a graph for explaining a threshold according to a modified example.

DETAILED DESCRIPTION

In the following, an example of an embodiment for carrying out the present disclosure is described in detail with reference to the drawings.

First Embodiment

Figure 1:
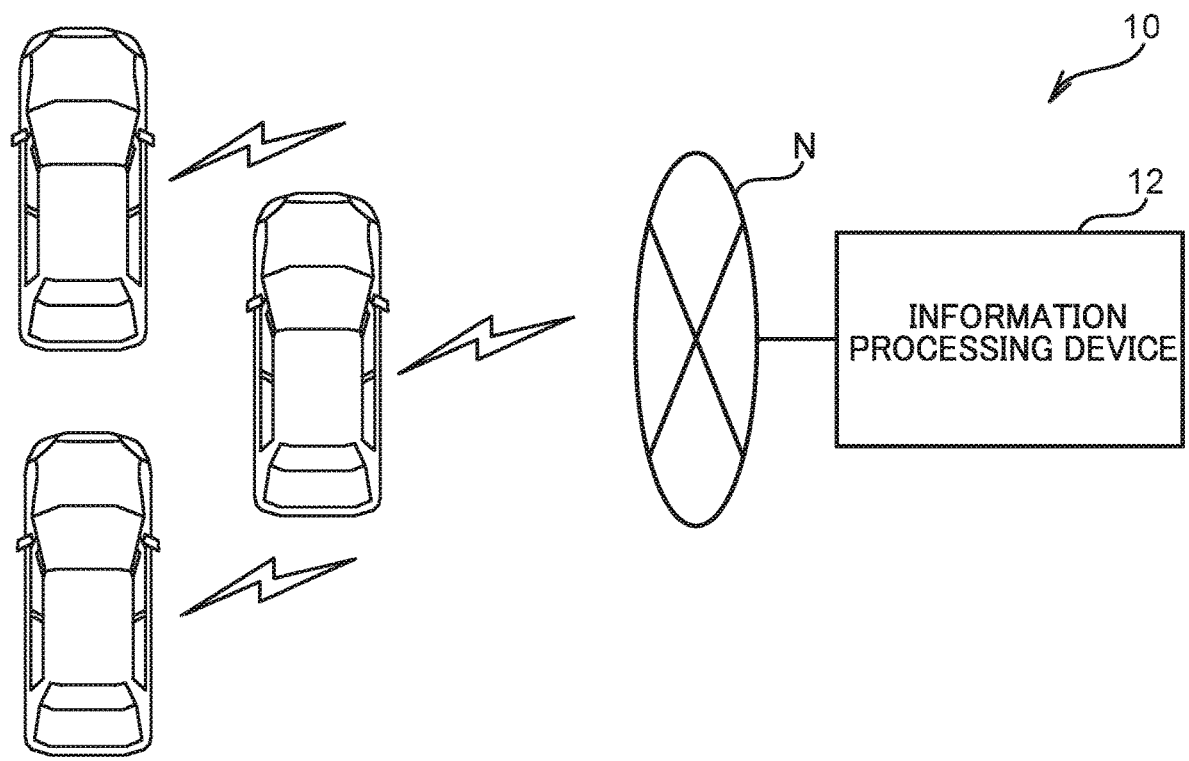
FIG. 1 is a block diagram illustrating an example of a configuration of a driving behavior evaluation system according to each embodiment.

First, a configuration of a driving behavior evaluation system 10 according to the present embodiment is described with reference to FIG. 1. As shown in FIG. 1, the driving behavior evaluation system 10 includes an information processing device 12 connected to a network N such as the Internet. The information processing device 12 can transmit and receive information to and from each of the plurality of vehicles via the network N. Each vehicle is connected to the network N by, for example, wireless communication. The information processing device 12 is an example of the driving behavior evaluation device according to the disclosed technology. An example of the information processing device 12 is a server computer.

Figure 2:
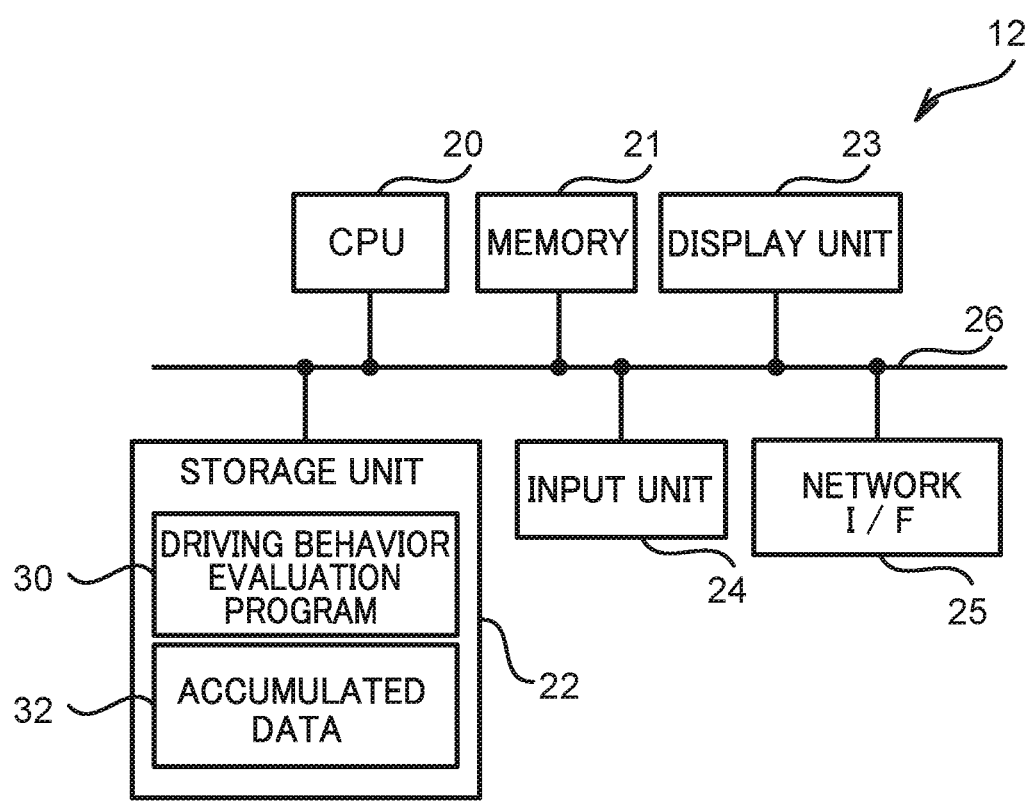
FIG. 2 is a block diagram showing an example of a hardware configuration of an information processing device according to each embodiment.

Next, a hardware configuration of the information processing apparatus 12 according to the present embodiment will be described with reference to FIG. 2. As shown in FIG. 2, the information processing device 12 includes a CPU, that is, a central processing unit 20, a memory 21 that serves as a temporary storage area, and a nonvolatile memory unit 22. The information processing device 12 includes a display unit 23 such as a liquid crystal display, an input unit 24 such as a keyboard and a mouse, and a network I/F connected to the network N, that is, an interface 25. The CPU 20, the memory 21, the storage unit 22, the display unit 23, the input unit 24, and the network I/F 25 are connected to a bus 26.

The storage unit 22 is realized by a hard disk drive (HDD), a solid state drive (SSD), a flash memory, or the like. The driving behavior evaluation program 30 is stored in the storage unit 22 as a memory or a non-transitory storage medium. The CPU 20 serving as a processor reads out the driving behavior evaluation program 30 from the storage unit 22 and then outputs it to the memory 21, and executes the outputted driving behavior evaluation program 30. The storage unit 22 stores accumulated data 32.

Figure 3:
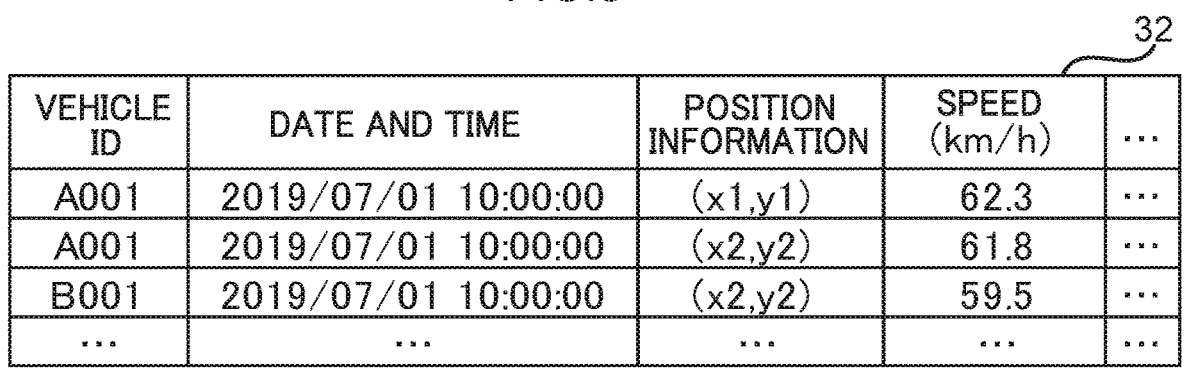
FIG. 3 is a diagram showing an example of accumulated data according to each embodiment.

The stored data 32 according to the present embodiment will be described with reference to FIG. 3. As shown in FIG. 3, the stored data 32 includes a vehicle ID as identification information of the vehicle periodically transmitted from each vehicle, that is, an Identifier, data transmission date and time, vehicle position information at the time of data transmission, and time-series data of the speed of the vehicle at the time of data transmission. As the position information of the vehicle, for example, a GPS provided in the vehicle, that is, a latitude and longitude derived using a Global Positioning System device can be applied.

Figure 4:
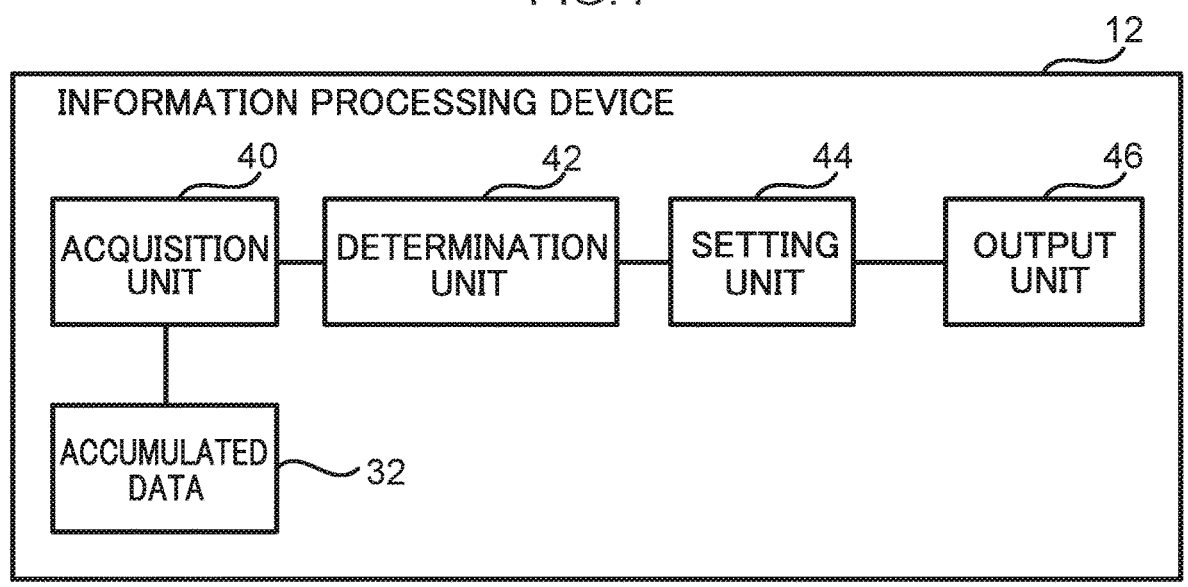
FIG. 4 is a block diagram showing an example of a functional configuration of the information processing device according to a first embodiment.

Next, a functional configuration of the information processing apparatus 12 according to the present embodiment will be described with reference to FIG. 4. As illustrated in FIG. 4, the information processing device 12 includes an acquisition unit 40, a determination unit 42, a setting unit 44, and an output unit 46. When the CPU 20 of the information processing device 12 executes the driving behavior evaluation program 30 stored in the storage unit 22, the CPU 20 functions as the acquisition unit 40, the determination unit 42, the setting unit 44, and the output unit 46 illustrated in FIG. 4.

The acquisition unit 40 acquires the speed, transmission date and time, and position information of the target vehicle from the accumulated data 32. The target vehicle may be specified by the user, for example, or may be each vehicle whose position indicated by the position information is within the speed regulation area. The speed regulation area in this case is set in advance, for example, in the map information. The data to be acquired from the accumulated data 32 may be, for example, data whose transmission date and time is included in a period specified by the user, or data whose transmission date and time is included in a predetermined period. This predetermined period may be one day, for example, when a driving behavior evaluation process described later is executed once a day.

Figure 5:
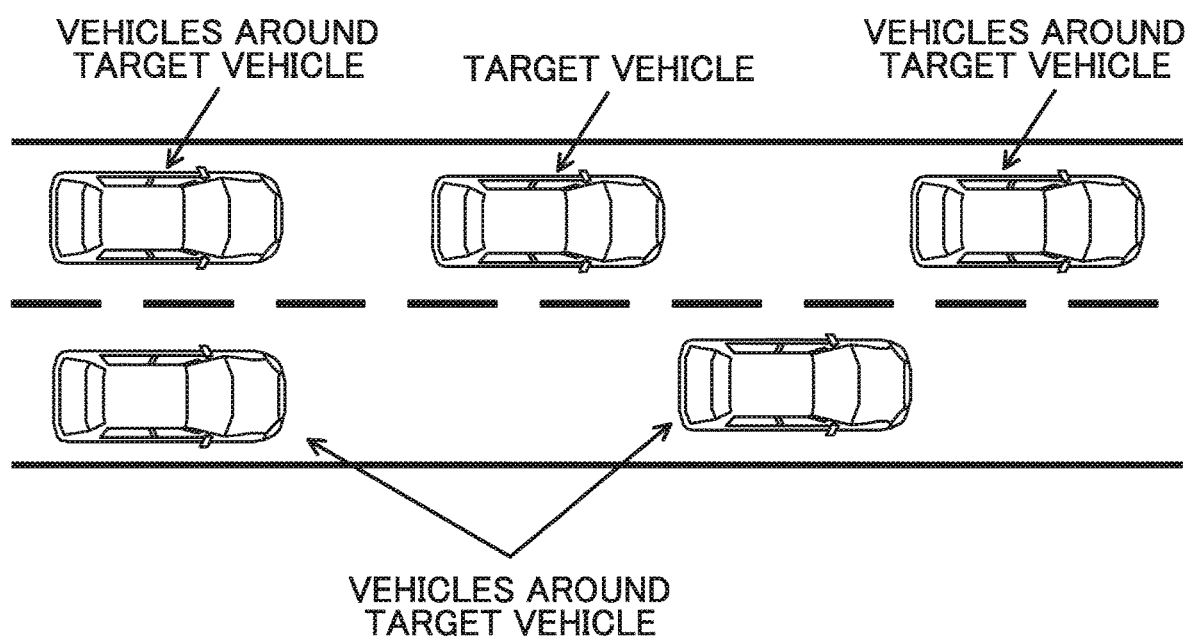
FIG. 5 is a plan view showing an example of a target vehicle and surrounding vehicles.

In addition, the acquisition unit 40 acquires the speeds of the vehicles around the target vehicle from the accumulated data 32 using the acquired transmission date and time and position information. Specifically, as shown in FIG. 5, as an example, the acquisition unit 40 determines that the transmission date and time of the records of the vehicle IDs other than the vehicle ID of the target vehicle in the accumulated data 32 are within an allowable range from the acquired transmission date and time, and acquires the speed of a record in which the position indicated by the position information is within a predetermined distance range around the position of the target vehicle. The allowable range here means, for example, a range in which an error in the transmission timing of data of each vehicle is allowed. In addition, the predetermined distance includes, for example, a distance determined as the periphery of the target vehicle, such as a distance for three vehicles. Note that, at the time of acquisition of this record, vehicles that are estimated to travel in the lane opposite to the lane in which the target vehicle is traveling may be excluded from the surrounding vehicles using the history of the position information.

The determination unit 42 derives an average speed that is an average value of the speeds of the surrounding vehicles acquired by the acquisition unit 40. Then, the determination unit 42 determines whether or not the speed of the target vehicle acquired by the acquisition unit 40 exceeds the regulation speed, and whether the amount of deviation of the speed of the target vehicle from the derived average speed is equal to or greater than the threshold value TH. This regulation speed can be acquired from, for example, map information. Further, as the threshold value TH in this case, a value predetermined as a deviation amount of the speed of the vehicle that does not disturb the traffic flow, for example, 10 km/h or the like can be used. Further, the deviation amount is acquired, for example, by an absolute value of a difference between the derived average speed and the speed of the target vehicle.

The setting unit 44, in a case in which the determination unit 42 determines that the speed of the target vehicle exceeds the regulation speed and that the divergence amount is equal to or greater than the threshold value TH, sets a lower evaluation for the driving behavior of the vehicle than a case in which the speed of the target vehicle exceeds the regulation speed and the divergence amount is less than the threshold value TH. In addition, the setting unit 44 sets a higher evaluation for the driving behavior of the vehicle when the determination unit 42 determines that the speed of the target vehicle is equal to or lower than the regulation speed than when the speed of the target vehicle exceeds the regulation speed.

Specifically, when the speed of the target vehicle is equal to or lower than the regulation speed, the setting unit 44 sets the evaluation of the driving behavior of the vehicle to "A rank". In addition, when the speed of the target vehicle exceeds the regulation speed and the amount of deviation is less than the threshold TH, the setting unit 44 sets the evaluation of the driving behavior of the vehicle to "B rank". In addition, when the speed of the target vehicle exceeds the regulation speed and the amount of deviation is equal to or greater than the threshold TH, the setting unit 44 sets the evaluation of the driving behavior of the vehicle to "C rank". The setting here means, for example, that information indicating evaluation of the driving behavior of the vehicle is stored in the storage unit 22 in association with the vehicle ID. The evaluation of the driving behavior of the vehicle according to the present embodiment means that the rank A is the highest, the rank C is the lowest, and the rank B is between the ranks A and C. In addition, the evaluation of the driving behavior when the speed of the target vehicle exceeds the regulation speed may be performed not in two steps but in three or more steps. In this case, a form in which a plurality of threshold values TH to be compared with the above-described deviation amount are provided is exemplified.

The output unit 46 outputs the evaluation of the driving behavior of the vehicle set by the setting unit 44. Specifically, the output unit 46 displays the evaluation on the driving behavior of the vehicle on the display unit 23. The output unit 46 may, for example, notify the driver of the target vehicle of the evaluation of the driving behavior of the vehicle by e-mail or the like.

Figure 6:
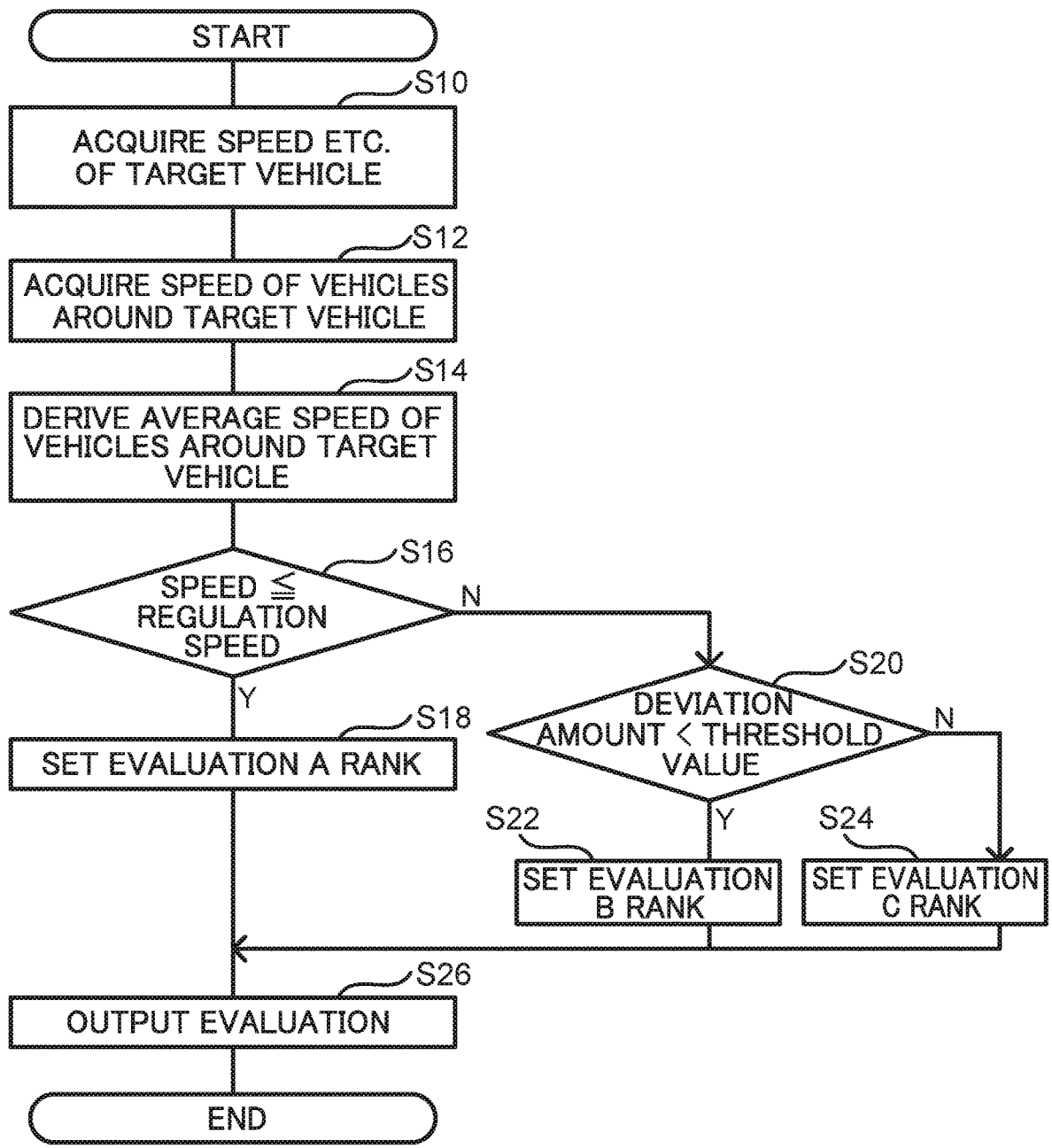
FIG. 6 is a flowchart illustrating an example of a driving behavior evaluation process according to the first embodiment.

Next, a specific processing example of the information processing apparatus 12 according to the present embodiment will be described with reference to FIG. 6. FIG. 6 is a flowchart illustrating an example of the flow of the driving behavior evaluation process performed by the CPU 20 of the information processing device 12 according to the present embodiment. The driving behavior evaluation process shown in FIG. 6 is executed by the CPU 20 executing the driving behavior evaluation program 30 stored in the storage unit 22. The driving behavior evaluation process shown in FIG. 6 is executed at a regular timing, for example, once a day.

In step S10 of FIG. 6, the acquisition unit 40 acquires the speed, transmission date and time, and position information of the target vehicle from the accumulated data 32, as described above. For example, when records at a plurality of times are acquired from the accumulated data 32 in step S10, steps S12 to S24 described below are executed for each record.

In step S12, as described above, the acquisition unit 40 acquires the speed of the vehicle around the target vehicle from the accumulated data 32 using the transmission date and time and the position information acquired in step S10. In step S14, the determination unit 42 derives an average speed that is an average value of the speeds of the surrounding vehicles acquired in step S12.

In step S16, the determination unit 42 determines whether the speed of the target vehicle acquired in step S10 is equal to or lower than the regulation speed. If the result of this determination is negative, the processing advances to step S20, and if the result of the determination is affirmative, the processing advances to step S18. In step S18, the setting unit 44 sets the evaluation of the driving behavior of the vehicle to "A rank" as described above. When the processing of step S18 is complete, the processing advances to step S26.

In step S20, the determination unit 42 determines whether or not the deviation amount of the speed of the target vehicle acquired in step S10 from the average speed derived in step S14 is less than the threshold value TH. If the result of this determination is negative, the processing advances to step S24, and if the result of the determination is affirmative, the processing advances to step S22. In step S22, the setting unit 44 sets the evaluation of the driving behavior of the vehicle to "A rank" as described above. When the processing of step S22 is complete, the processing advances to step S26.

In step S24, the setting unit 44 sets the evaluation of the driving behavior of the vehicle to "C rank" as described above. When the processing of step S24 is complete, the processing advances to step S26. In step S26, the output unit 46 outputs the evaluation of the driving behavior of the vehicle set in step S18, S22, or S24, as described above. When the processing in step S26 ends, the driving behavior evaluation processing ends. The evaluation of the driving behavior of the vehicle set by the execution of the driving behavior evaluation processing can be used, for example, for calculating an insurance premium. Further, for example, in an area where the evaluation of the driving behavior of the vehicle is relatively low, it can be used for safety measures such as erecting a sign for promoting safe driving. In addition, when the evaluation of the driving behavior is set at each of the plurality of time points of the target vehicle, the evaluation of the driving behavior may be set according to the frequency of the evaluation rank.

As described above, according to the present embodiment, when the speed of the target vehicle exceeds the regulation speed and the amount of deviation of the speed of the target vehicle from the average speed of the vehicles around the target vehicle is equal to or larger than the threshold, the evaluation of the driving behavior of the vehicle is set lower than the case where the speed of the vehicle exceeds the regulation speed and the deviation amount is less than the threshold value. Therefore, the evaluation of the driving behavior of the vehicle can be appropriately determined in consideration of the traffic flow, so that the driver's uncomfortable feeling about the evaluation of the driving behavior of the vehicle can be reduced.

Second Embodiment

In the second embodiment, a description will be given of an embodiment in which the driving behavior of the vehicle is evaluated on the vehicle side. Note that the configuration of the driving behavior evaluation system 10 and the hardware configuration of the information processing device 12 are the same as those of the first embodiment shown in FIG. 1 and FIG. 2 and explanation is omitted. Also, in the present embodiment, similarly to the first embodiment, the storage data 32 is stored in the storage unit 22 of the information processing device 12.

Figure 7:
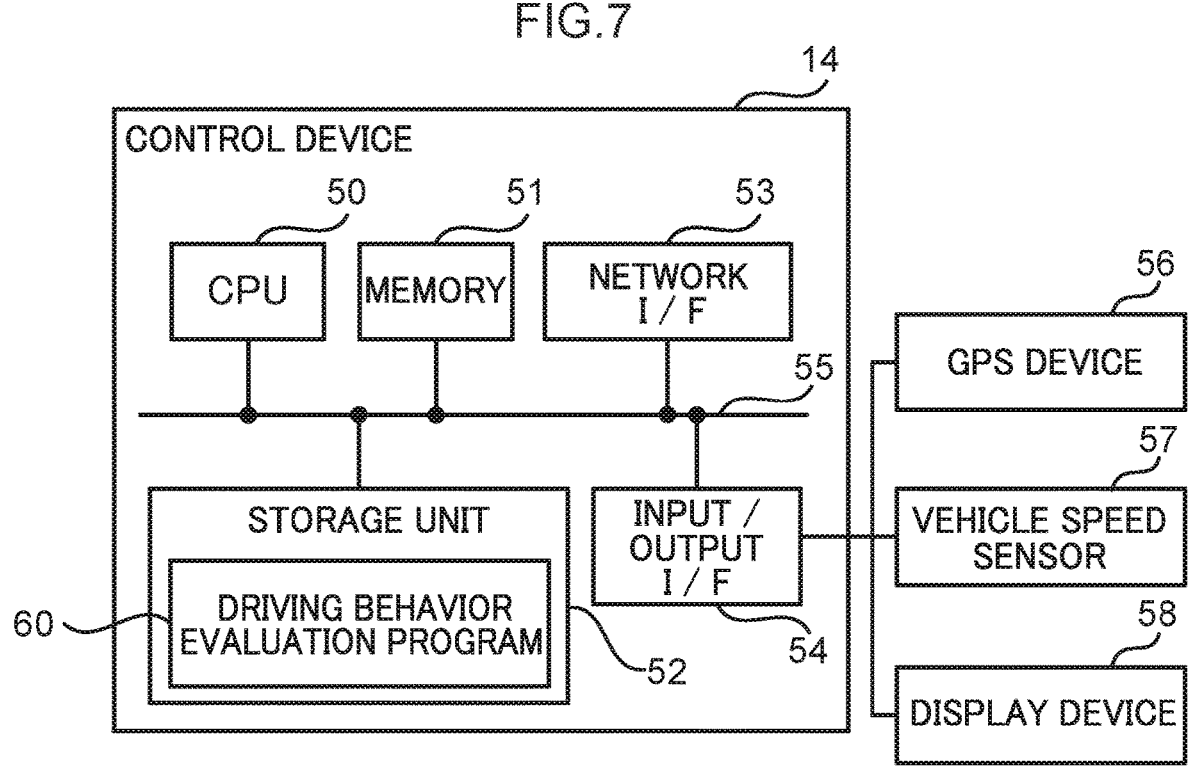
FIG. 7 is a block diagram showing an example of a hardware configuration of a control device according to a second embodiment.

Next, a hardware configuration of the control device 14 mounted on the vehicle according to the present embodiment will be described with reference to FIG. 7. As shown in FIG. 7, the control device 14 includes a CPU 50, a memory 51 as a temporary storage area, and a nonvolatile storage unit 52. Further, the control device 14 includes a network I/F 53 connected to the network N, and an input/output I/F 54. A GPS device 56, a vehicle speed sensor 57, and a display device 58 are connected to the input/output I/F 54. A CPU 50 as a processor, a memory 51, a storage unit 52 as a memory or a non-transitory storage medium, a network I/F 53, and an input/output I/F 54 are connected to a bus 55. The control device 14 is an example of the driving behavior evaluation device according to the disclosed technology. An example of the control device 14 is an ECU, that is, an electronic control unit.

The storage unit 52 is realized by an HDD, an SSD, a flash memory, or the like. The storage unit 52 as a storage medium stores a driving behavior evaluation program 60. The CPU 20 reads out the driving behavior evaluation program 60 from the storage unit 52 and then outputs it to the memory 51, and executes the outputted driving behavior evaluation program 60.

The GPS device 56 receives GPS signals from a plurality of GPS satellites, measures the position of the own vehicle, and outputs, to the control device 14, position information indicating the measured position of the own vehicle. The vehicle speed sensor 57 detects the speed of the own vehicle and outputs the detected speed of the own vehicle to the control device 14. The display device 58 displays information input from the control device 14. An example of the display device 58 is a display of a car navigation system. The display device 58 may be a display of a portable information terminal connected to the control device 14 by wireless communication.

Figure 8:
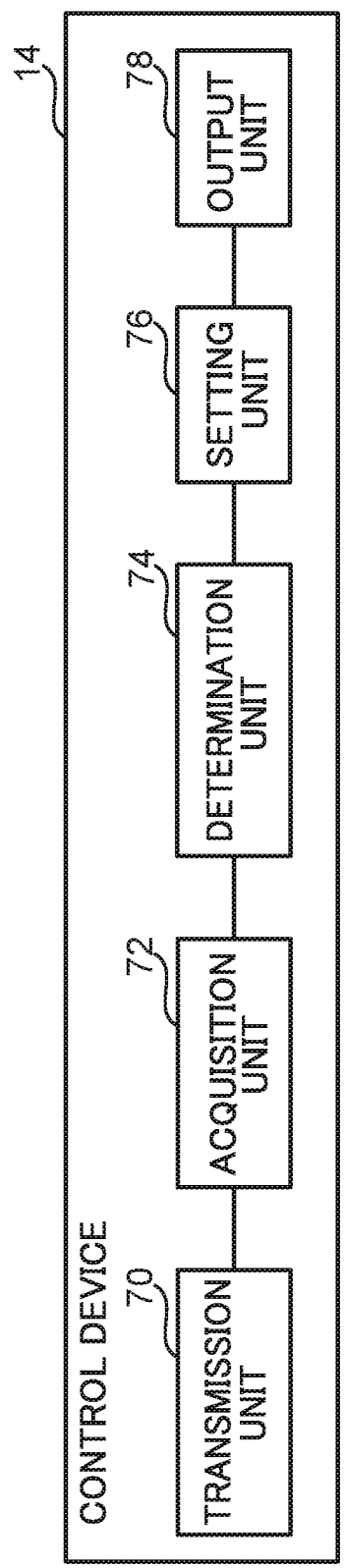
FIG. 8 is a block diagram showing an example of a functional configuration of the control device according to the second embodiment.

Next, a functional configuration of the control device 14 according to the present exemplary embodiment is described with reference to FIG. 8. As shown in FIG. 8, the control device 14 includes a transmission unit 70, an acquisition unit 72, a determination unit 74, a setting unit 76, and an output unit 78. The CPU 50 of the control device 14 executes the driving behavior evaluation program 60 stored in the storage unit 52. Thereby, it functions as the transmission unit 70, the acquisition unit 72, the determination unit 74, the setting unit 76, and the output unit 78 illustrated in FIG. 8.

The transmission unit 70 acquires the position information indicating the position of the own vehicle from the GPS device 56, and transmits the acquired position information to the information processing device 12. In the present embodiment, the own vehicle is an example of a target vehicle according to the disclosed technology.

When the information processing device 12 receives the position information transmitted from the control device 14, the information processing device 12 uses the received position information to acquire the speeds of the vehicles around the target vehicle from the accumulated data 32. Specifically, for example, among each record of the accumulated data 32, the information processing apparatus 12 acquires the speed of records for which the position indicated by the position information is within the range of a predetermined distance centered on the position indicated by the received position information in the latest predetermined period, for example, one day. Further, the information processing device 12 derives the average speed of the vehicles around the target vehicle by deriving the average value of the acquired speeds. That is, the peripheral vehicles in the present embodiment are not the vehicles traveling around the target vehicle at the same timing, but the vehicles that traveled around the target vehicle during a predetermined period in the past. Then, the information processing device 12 transmits the derived average speed of the surrounding vehicles to the control device 14. If the vehicle traveling around the own vehicle also transmits position information to the information processing device 12 similarly to the own vehicle, the vehicle traveling around the own vehicle at the same timing can be made a nearby vehicle.

The acquiring unit 72 acquires the average speed of the surrounding vehicles transmitted from the information processing device 12. The acquisition unit 72 acquires the speed of the own vehicle detected by the vehicle speed sensor 57. Note that the information processing device 12 may transmit the acquired speeds of the surrounding vehicles to the control device 14 and derive an average value of the speeds of the surrounding vehicles received by the control device 14.

The determining unit 74 determines whether or not the speed of the own vehicle acquired by the acquiring unit 72 exceeds the regulated speed, and whether or not the amount of deviation of the speed of the own vehicle from the acquired average speed of the surrounding vehicles is equal to or greater than a threshold value TH.

Like the setting unit 44 according to the first embodiment, in a case in which the determination unit 74 determines that the speed of the own vehicle exceeds the regulation speed and that the divergence amount is equal to or greater than the threshold value TH, the setting unit 76 sets a lower evaluation for the driving behavior of the vehicle than a case in which the speed of the own vehicle exceeds the regulation speed and the divergence amount is less than the threshold value TH. In addition, the setting unit 76 sets a higher evaluation for the driving behavior of the vehicle when the determination unit 74 determines that the speed of the own vehicle is equal to or lower than the regulation speed than when the speed of the own vehicle exceeds the regulation speed.

The output unit 78 outputs the evaluation of the driving behavior of the vehicle set by the setting unit 76. Specifically, the output unit 78 displays the evaluation on the driving behavior of the vehicle on the display device 58 by outputting the evaluation to the display device 58. The output unit 78 may output the evaluation of the driving behavior of the vehicle to a sound output device such as a speaker mounted on the vehicle.

Next, a specific processing example of the information processing device 14 according to the present embodiment will be described with reference to FIG. 9. FIG. 9 is a flowchart illustrating an example of the flow of the driving behavior evaluation process performed by the CPU 50 of the information processing device 14 according to the present embodiment. The driving behavior evaluation process shown in FIG. 9 is executed by the CPU 50 executing the driving behavior evaluation program 60 stored in the storage unit 52. The driving behavior evaluation process shown in FIG. 9 is executed at a regular timing, for example, once an hour, or at a timing when the vehicle passes a predetermined check point.

In step S30 in FIG. 9, the transmitting unit 70 acquires position information indicating the position of the own vehicle from the GPS device 56, and transmits the acquired position information to the information processing device 12. As described above, the information processing device 12 transmits the average speed of the surrounding vehicles to the control device 14 corresponding to the position information transmitted in step S30. Therefore, in step S32, the acquisition unit 72 acquires the average speed of the surrounding vehicles transmitted from the information processing device 12.

In step S34, the acquisition unit 72 acquires the speed of the own vehicle detected by the vehicle speed sensor 57. In step S36, the determination unit 74 determines whether or not the speed of the own vehicle acquired in step S34 is equal to or less than the regulation speed. If the result of this determination is negative, the processing advances to step S40, and if the result of the determination is affirmative, the processing advances to step S38. In step S38, the setting unit 76 sets the evaluation of the driving behavior of the vehicle to "A rank" as described above. When the processing of step S38 is complete, the processing advances to step S46.

In step S40, the determination unit 74 determines whether or not the deviation amount of the speed of the own vehicle acquired in step S34 from the average speed derived in step S32 is less than the threshold value TH. If the result of this determination is negative, the processing advances to step S44, and if the result of the determination is affirmative, the processing advances to step S42. In step S42, the setting unit 76 sets the evaluation of the driving behavior of the vehicle to "B rank" as described above. When the processing of step S42 is complete, the processing advances to step S46.

In step S44, the setting unit 76 sets the evaluation of the driving behavior of the vehicle to "C rank" as described above. When the processing of step S44 is complete, the processing advances to step S46. In step S46, the output unit 78 outputs the evaluation of the driving behavior of the vehicle set in step S38, S42, or S44, as described above. When the processing in step S46 ends, the driving behavior evaluation processing ends.

As described above, according to the present embodiment, the same effects as in the first embodiment can be acquired.

In each of the above embodiments, a case has been described in which the threshold value TH for comparing with the deviation amount of the speed of the target vehicle with respect to the average speed of the surrounding vehicles of the target vehicle is a fixed value, but the present invention is not limited to this. For example, the threshold value TH may be different depending on the traffic volume of the vehicle. Specifically, for example, the threshold value TH may be set to a larger value when the target vehicle travels in a suburban area than in an urban area. In this case, an embodiment is exemplified in which whether the area is an urban area or a suburb is set for each area in the map information in advance, and whether the traveling area of the target vehicle is an urban area or a suburb is specified using the map information.

Further, for example, as shown in FIG. 10, the threshold value TH may be set to a larger value when the target vehicle travels at midnight than when it is not at midnight. In this case, an embodiment is exemplified in which time zone is midnight, for example, "0:00 am to 2:00 am" or "0:00 am to 5:00 am" is set in advance. The vertical axis in FIG. 10 represents the speed of the vehicle, and the horizontal axis represents the time zone. The solid line in FIG. 10 indicates the average speed of the surrounding vehicles, and the dashed line in FIG. 10 indicates the speed acquired by adding the threshold value TH to the average speed of the surrounding vehicles. That is, in the example of FIG. 10, when the speed of the target vehicle exceeds the regulation speed, is equal to or higher than the speed of the solid line, and is lower than the speed of the alternate long and short dash line, the evaluation of the driving behavior of the vehicle is set to "B rank". In the example of FIG. 10, when the speed of the target vehicle exceeds the regulated speed and is equal to or higher than the speed indicated by the dashed line, the evaluation of the driving behavior of the vehicle is set to "C rank". Further, the threshold value TH may be a different value depending on both the traveling area and the traveling time zone of the target vehicle.

As described above, in the area and the time zone where the traffic volume is considered to be high, the threshold value is set smaller than that in the area and the time zone where the traffic volume is considered to be small, that is, by making the criterion stricter, the evaluation of the driving behavior of the vehicle can be appropriately determined in consideration of traffic flow. As a result, the driver's discomfort with respect to the evaluation of the driving behavior of the vehicle can be further reduced.

Further, in the second embodiment, an image of a surrounding vehicle may be taken at a predetermined frame rate using an on-vehicle camera. In this case, an embodiment is exemplified in which the speed of the surrounding vehicle is derived using the relative distance between the surrounding vehicle and the own vehicle in a plurality of continuous images, the speed of the own vehicle, and the time interval between successive frames determined from the frame rate.

Further, although the processing performed by the CPUs 20 and 50 in the above embodiment has been described as software processing performed by executing a program, the processing may be performed by the ASIC, that is, the application specific integrated circuit and the FPGA, that is, the hardware such as the Field-Programmable Gate Array. Further, the processing executed by the CPUs 20 and 50 may be processing that is implemented by a combination of both software and hardware. The driving behavior evaluation programs 30 and 60 stored in the storage units 22 and 52 are stored in various non-temporary storage media such as a DVD, that is, a Digital Versatile Disc, and distributed, and may be executed by processors such as the CPU 20 and the CPU 50.

The present disclosure is not limited by the above example embodiments. In addition to the above example embodiments, it will be clear that numerous modifications may be embodied within a technical scope not departing from the gist of the disclosure.

What is claimed is:

1. A driving behavior evaluation device, comprising:
a memory; and
a processor,
wherein, in a case in which a speed of a target vehicle exceeds a regulation speed and an amount of deviation of the speed of the target vehicle with respect to an average speed of vehicles around the target vehicle is equal to or greater than a threshold value, the processor is configured to set an evaluation of driving behavior of the target vehicle to a lower value than in a case in which the speed of the target vehicle exceeds the regulation speed and the amount of deviation is less than the threshold value,
wherein the processor is configured to set the threshold value to a different value depending on a volume of traffic.

2. The driving behavior evaluation device according to claim 1, wherein the processor is configured to set the threshold value to a different value depending on at least one of a traveling area of the target vehicle or a traveling time of day of the target vehicle.

3. The driving behavior evaluation device according to claim 2, wherein, in a case in which the traveling area of the target vehicle is a suburban area, the processor is configured to set the threshold value to a higher value than in a case in which the traveling area of the target vehicle is an urban area.

4. The driving behavior evaluation device according to claim 2, wherein, in a case in which the traveling time of day of the target vehicle is at night, the processor is configured to set the threshold value to a higher value than in a case in which the traveling time of day of the target vehicle is a time other than at night.

5. A driving behavior evaluation method in which, in a case in which a speed of a target vehicle exceeds a regulation speed and an amount of deviation of the speed of the target vehicle with respect to an average speed of vehicles around the target vehicle is equal to or greater than a threshold value, a processor sets an evaluation of driving behavior of the target vehicle to a lower value than in a case in which the speed of the target vehicle exceeds the regulation speed and the amount of deviation is less than the threshold value, wherein the processor sets the threshold value to a different value depending on a volume of traffic.

6. The driving behavior evaluation method according to claim 5, wherein the processor sets the threshold value to a different value depending on at least one of a traveling area of the target vehicle or a traveling time of day of the target vehicle.

7. The driving behavior evaluation method according to claim 6, wherein, in a case in which the traveling area of the target vehicle is a suburban area, the processor sets the threshold value to a higher value than in a case in which the traveling area of the target vehicle is an urban area.

8. The driving behavior evaluation method according to claim 6, wherein, in a case in which the traveling time of day of the target vehicle is at night, the processor sets the threshold value to a higher value than in a case in which the traveling time of day of the target vehicle is a time other than at night.

9. A non-transitory storage medium that stores a program that causes a processor to execute driving behavior evaluation processing, the processing including setting, in a case in which a speed of a target vehicle exceeds a regulation speed and an amount of deviation of the speed of the target vehicle with respect to an average speed of vehicles around the target vehicle is equal to or greater than a threshold value, an evaluation of driving behavior of the target vehicle to a lower value than in a case in which the speed of the target vehicle exceeds the regulation speed and the amount of deviation is less than the threshold value, wherein the non-transitory storage medium stores a program that causes the processor to execute the driving behavior evaluation processing in which the threshold value is a different value depending on a volume of traffic.

10. The non-transitory storage medium according to claim 9, wherein the non-transitory storage medium stores a program that causes the processor to execute the driving behavior evaluation processing in which the threshold value is a different value depending on at least one of a traveling area of the target vehicle or a traveling time of day of the target vehicle.

11. The non-transitory storage medium according to claim 10, wherein the non-transitory storage medium stores a program that causes the processor to execute the driving behavior evaluation processing in which the threshold value is a higher value in a case in which the traveling area of the target vehicle is a suburban area than in a case in which the traveling area of the target vehicle is an urban area.

12. The non-transitory storage medium according to claim 10, wherein the non-transitory storage medium stores a program that causes the processor to execute the driving behavior evaluation processing in which the threshold value is a higher value in a case in which the traveling time of day of the target vehicle is at night than in a case in which the traveling time of day of the target vehicle is a time other than at night.

* * * * *